Oct. 30, 1923.
G. R. RODDY
1,472,679
TRAVELING CONVEYER WITH GRAVITY ROLLERS
Filed June 9, 1921   4 Sheets-Sheet 3
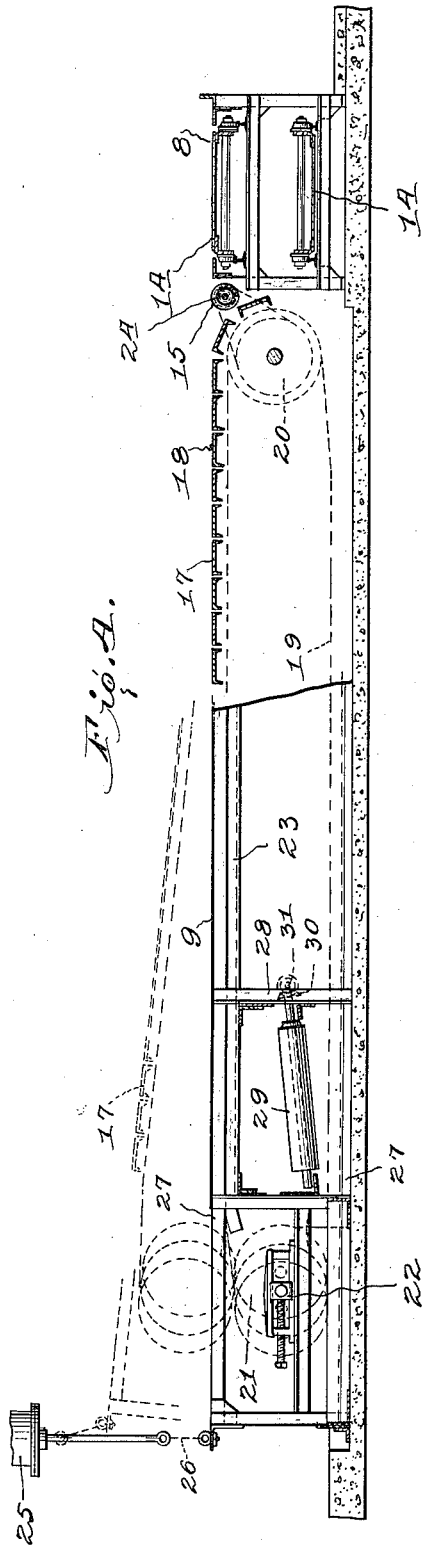
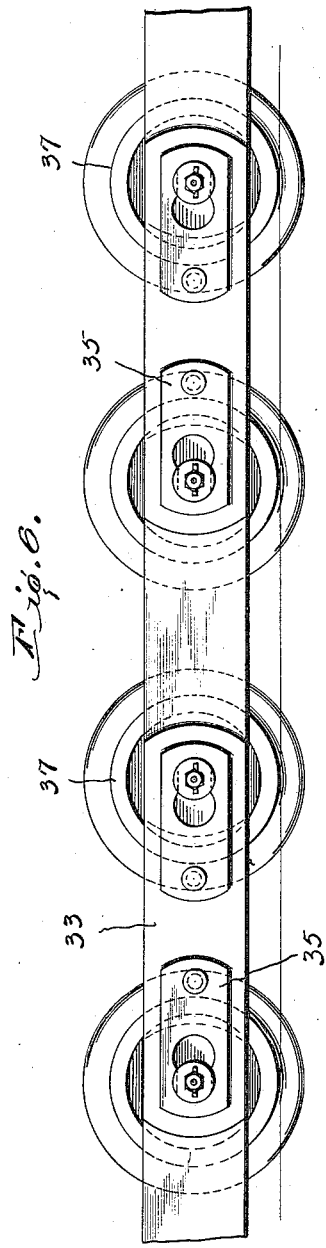
Inventor
Gustav R. Roddy.
By John S. Barker
Attorney

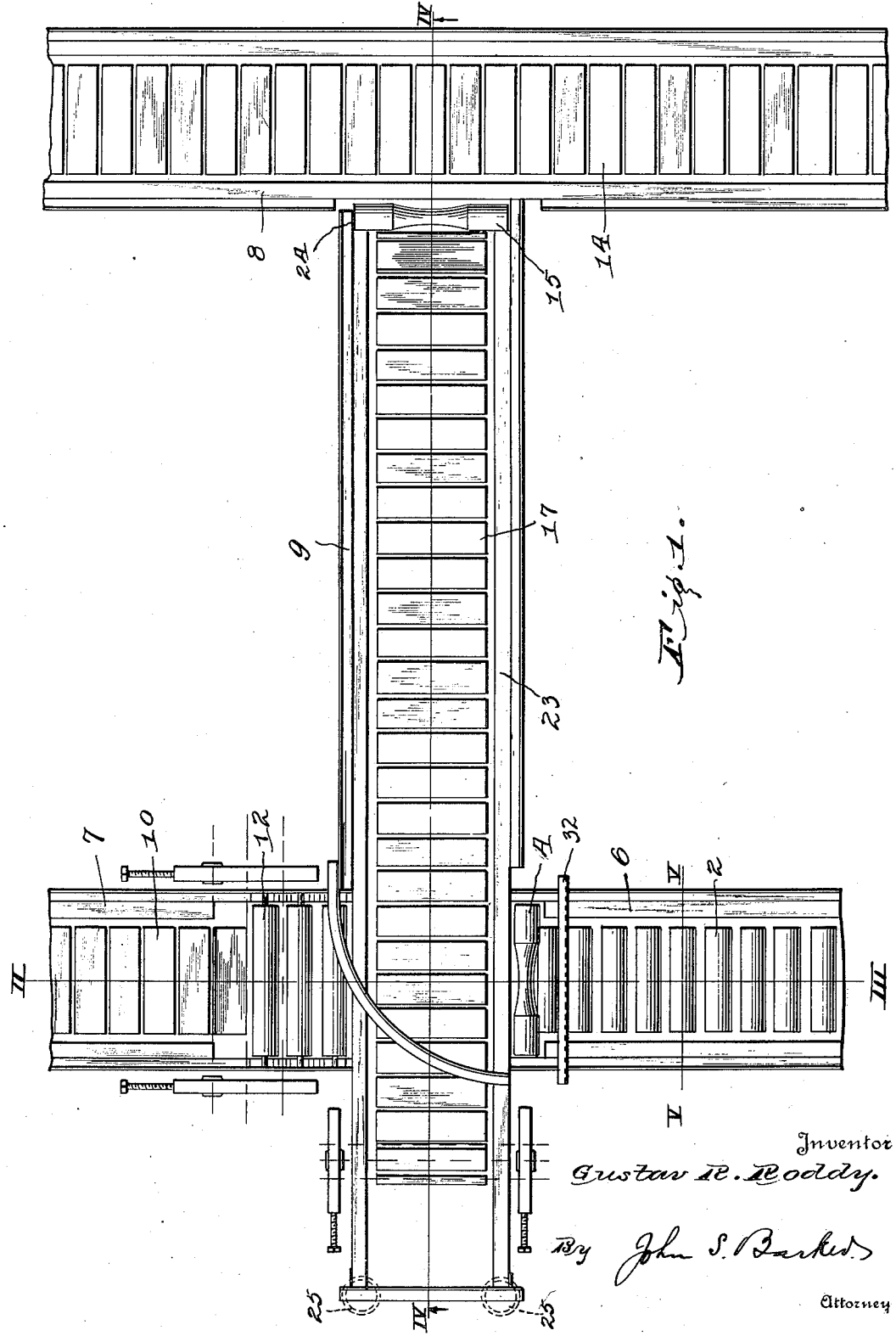

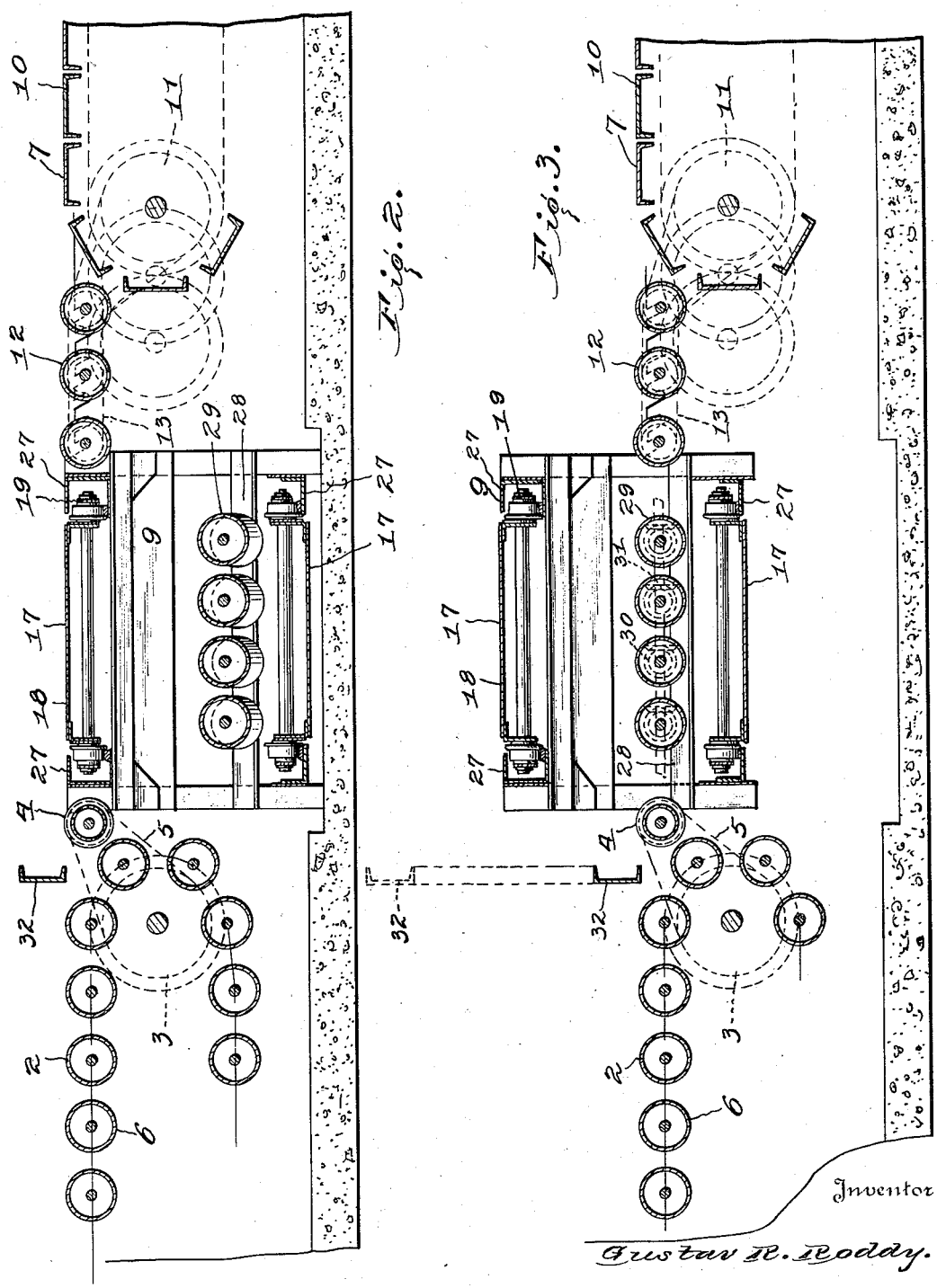

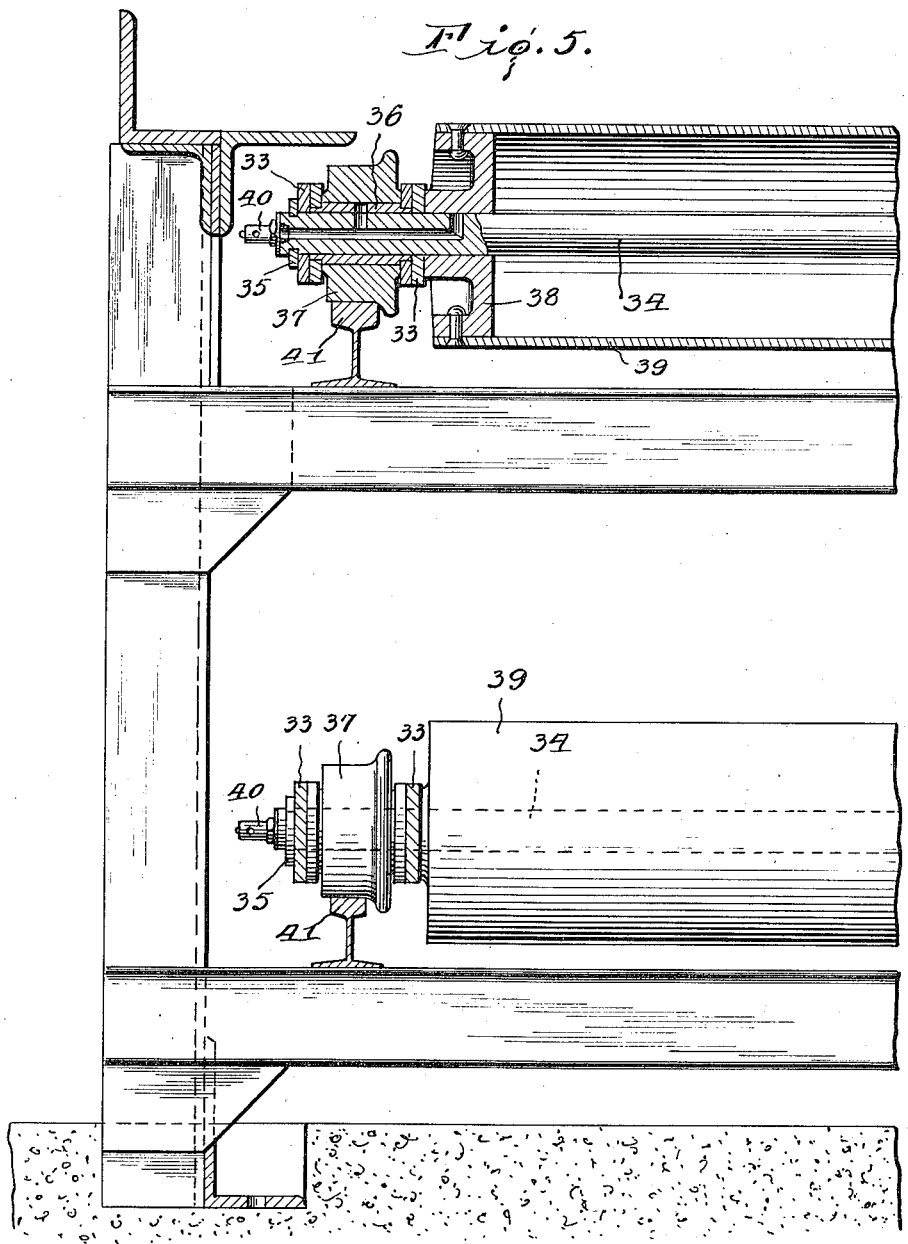

Patented Oct. 30, 1923.

1,472,679

UNITED STATES PATENT OFFICE.

GUSTAV R. RODDY, OF MILWAUKEE, WISCONSIN, ASSIGNOR TO CHAIN BELT COMPANY, OF MILWAUKEE, WISCONSIN, A CORPORATION OF WISCONSIN.

TRAVELING CONVEYER WITH GRAVITY ROLLERS.

Application filed June 9, 1921. Serial No. 476,282.

*To all whom it may concern:*

Be it known that I, GUSTAV R. RODDY, a citizen of the United States, residing at Milwaukee, in the county of Milwaukee and State of Wisconsin, have invented certain new and useful Improvements in Traveling Conveyers with Gravity Rollers, of which the following is a specification.

My invention relates to a system of conveying apparatus for delivering packages and articles to one or another place accordingly as the system is arranged and as it is the desire of the one controlling the operation thereof. In the accompanying drawings I have shown, largely diagrammatically, an embodiment of the invention especially planned for delivering molds in a factory; but the invention is capable of a wide variety of uses demanding different arrangements of the several parts of the apparatus. The accompanying illustration is of a very simple arrangement, showing but two longitudinal conveyers and one transverse connecting conveyer between these. The invention, however, is capable of much more elaborate development wherein the number of longitudinal and transverse conveyers are increased over what is here shown and described.

In the drawings—

Figure 1 is a plan view of a conveying system embodying my present improvements.

Fig. 2 is a vertical sectional view taken on the line II—III of Fig. 1, as viewed from the right, showing the transverse conveyer in one of its operative positions.

Fig. 3 is a vertical sectional view, also taken on the line II—III as in Fig. 2, representing the transverse conveyer in another of its operative positions.

Fig. 4 is a vertical section, taken on the line IV—IV of Fig. 1 and on a plane at right angles to that indicated by the line II—III.

Fig. 5 is an enlarged detail transverse sectional view through the supply conveyer 6, taken on the line V—V of Fig. 1.

Fig. 6 is a detail view in side elevation illustrative of the chain employed in the conveyer 6.

Referring to the drawings 6 indicates a conveyer that I herein term the supply conveyer, since it is that conveying unit of the system, as illustrated in the drawings, that first receives the material to be distributed. 7 designates a longitudinal conveyer, represented as being in line with the supply conveyer 6, but separated therefrom by a space that is occupied by the transverse conveyer 9. This latter operates at right angles to the conveyers 6 and 7 and is adapted, when in one position, to receive material from the former and deliver it to a second longitudinal conveyer 8.

Each of the conveyers referred to is preferably power driven, but its form or type may be varied within wide limits to suit the uses to which it is intended to be put.

In a conveying system such as illustrated in the drawings, intended for use in a factory for conveying molds, the best results are obtained when the several conveyers are of the particular kinds that will be later pointed out in this specification.

The power-driven, movable element of the supply conveyer 6 consists of an endless conveyer 2, supported, at the end nearest to the transverse conveyer 9, upon head wheels 3. A roller 4, suitably supported in the framework of the conveyer, is located at the end of the endless movable element 2 and between it and the transverse conveyer 9. It operates to support the articles being conveyed while passing from conveyer 6 to 9 and insures better delivery thereof from one conveyer to the other than were it not employed. It is preferably power-driven, and I have represented driving connections 5 between the head wheel 3 and the roller.

The first longitudinal conveyer, 7,—the one in line with the supply conveyer 6,—is provided with an endless power-driven conveyer 10 that travels about and is supported by a foot wheel 11 at the end toward the transverse conveyer 9. Between the endless conveyer 10 and the transverse conveyer 9 is a set of power-driven rollers 12. These are represented as being driven, by sprocket chain gearing 13, from the foot wheel 11. The wheel 11 of the endless conveyer 10 is preferably adjustable in order that the proper tension may be maintained upon the conveyer, as indicated by the dotted line positions of the wheel 11 in Fig. 2. As the wheel is moved toward the transverse conveyer 9 it may become necessary to remove one or more of the rollers 12 and readjust the gearing 13 to permit the free approach of the wheel 11 and conveyer 10 toward the edge of the transverse conveyer 9.

The second longitudinal conveyer, 8, represented as being parallel with the conveyer 7, comprises an endless power-driven conveyer 14 of any suitable construction. The transverse conveyer 9 delivers thereto and a power-driven roller 15 is situated between the conveyers 9 and 8, placed there for the purpose of making the transfer of material from the former to the latter easy and certain.

The transverse conveyer 9 comprises an endless conveying element 17 mounted in a frame 23 that is pivotally supported, at 24, near the longitudinal conveyer 8. The conveyer 17 is preferably of the endless, power-driven, type, comprising a pair of chains 19 running on the wheels 20 and 21 and carrying supporting flights 18. One of the wheels is adjustable, for instance the wheels 21, which is shown as provided with adjusting means 22.

The frame 23 of the transverse conveyer is a unit adapted to swing in vertical planes about its pivotal supports 24. The free end of this frame lies between the conveyers 6 and 7, being of a width to fill this space as closely as working conditions will permit, and is vertically adjustable, for purposes that will be presently stated. It is formed with longitudinal channels or angle bars 27, the lower horizontal flanges of which support or themselves constitute tracks on which run the rollers or wheels of the conveyer chains 19. The endless conveyer 17, when supported and arranged as described, has two runs, the upper of which is the working run, and these are separated from each other a sufficient distance to permit the location between them of a short cross-over conveyer 29 that consists preferably a set of rollers supported in intermediate framework 28 of the main frame 23. The axes of the rollers 29 are disposed in vertical planes parallel with the lines of movement of the endless conveyer 17, but each such axis is inclined to the plane of the working run of the conveyer when the frame 23 is in normal, lowered, position, as represented in Fig. 4. The rollers 29 are preferably individually driven, through gearing 30, from a shaft 31 receiving its power from a suitable source, as for instance, a small electric motor. The cross-over conveyer 29 is located in line with the conveyers 6 and 7, and is adapted to be brought to such position as to bridge the space between these conveyers when the frame 23 is adjusted vertically to the position represented in Fig. 3. As has been set forth the free end of the frame 23 of the transverse conveyer is vertically adjustable, about the pivots 24, and to effect this any suitable means may be provided, such as, for instance, the cylinders 25 in which move pistons connected with the frame 23 by cables 26. Air or steam under pressure is admitted to the cylinders 25 and controls the movements and positions of the frame of the transverse conveyer. The normal position of this frame is that represented in Figs. 2 and 4. It then rests upon the ground or supports provided therefor, and the upper, working, run of its endless conveying element is in approximately the same plane as are the contiguous ends of the working surfaces of the conveyers 6 and 7. When thus arranged material delivered to the supply conveyer 6 is transported thereby across the roller 4 which assists in the advance of the material, and onto the transverse conveyer 9, by which it is, in turn, delivered across the roller 15, and onto the longitudinal conveyer 8, which, it it assumed, transports the material to the desired place of delivery. These transfers from one conveyer to another can be satisfactorily effected without the use of switches, one conveyer delivering directly to another, which receives and takes the load thus delivered and carries it on, until finally it reaches the place of delivery.

When it is desired to utilize the first longitudinal conveyer 7, instead of the second one, 8, the outer, free, end of the transverse conveyer 9 is lifted until the cross-over conveyer 29 is brought opposite the ends of the conveyers 6 and 7 and forms a bridge between them, as represented in Fig. 3. The rollers 29 are then driven and the material, delivered by the supply conveyer 6, will be passed thereby directly across the frame 23, and to the conveyer 7, by which is is taken to the desired place of delivery. It will be understood that whenever the parts are arranged as just described the movable conveyers 17 and 14 may be disconnected from their sources of power and remain at rest so long as the conveyer 7 is in use; and that on the other hand when the transverse conveyer 9 and the second longitudinal conveyer 8 are being used the first longitudinal conveyer 7 may remain at rest.

The power-driven elements of the several conveyers employed in the apparatus may be such as shown, or different therefrom, as the use to which the conveyer is put may suggest. I find, however, that it is desirable, not only in conveying apparatus for the transfer of molds, but also in conveying apparatus for many other uses, to form the supply conveyer 6 with gravity rollers, that is to say, with rollers such as are used in gravity conveyers, and being free each to rotate on its own axis or support independently of the others, and of its supporting carrier. The conveying element 2 of the supply conveyer is, when made as represented in the drawings, of the endless power-driven type, and comprises a pair of parallel chains 33 connected to each other by the cross shafts 34. These shafts, which are preferably formed of cylindrical metal rods, are held from rotating in their bearings in the chains by suitable locks such as indicated at 35. Each chain link is preferably formed of side bars spaced apart and having located between them wheels or rollers 37 adapted to travel upon tracks 41 mounted in the conveyer frame. These wheels are mounted upon bushings 36 upon the cross shafts 34 between the side bars of the links of the chains, 33. Rotatable heads 38 are mounted upon the shafts 34 just inside of the chains and carry tubes 39 closely fitting the heads to which they are secured. These tubes constitute the freely turning gravity rollers of the conveyer and serve as the supports upon which rest the articles to be transferred. The shafts 34 are preferably perforated and carry lubricators 40, by which the bearings for the wheels 37 and the rollers 39 are kept supplied with lubricant.

Cross stops 32 may be used in connection with the endless conveyer 2 wherever desired, and one is represented just in front of the roller 4. Whenever a stop is brought into play the articles being transferred by the conveyer are arrested in their progressive movements without, however, the conveyer 2 ceasing to move. The rollers 39 being freely turning upon their shafts permit the stoppage of the articles as just described without interfering with the movements of the conveyer 2, because as soon as an article is arrested in its forward movement the rollers begin to rotate on their axes as they are moved forwardly under the article, by the conveyer chains 33. The stops are used to arrest forward movement of the articles whenever the transverse conveyer 9 is adjusted vertically, as has been described.

What I claim is:—

1. In conveying apparatus, the combination of an endless traveling conveyer provided with an adjustable turning wheel at one of its ends, a plurality of rollers, located opposite the end of the conveyer at which is the adjustable turning wheel and forming, in effect, a continuation of the conveyer, the roller nearest the conveyer being removable to permit the endless conveyer to be adjusted toward the rollers by movement of its turning wheel, and a second conveyer located beyond the said rollers and cooperating therewith to form a continuous run for the material being conveyed.

2. The combination stated in claim 1 including means for positively rotating the said rollers.

3. In conveying apparatus, the combination of a straight-line conveyer, a second straight-line conveyer arranged at right angles to the first and disposed across and close to the delivery end thereof, a third straight-line conveyer arranged at right angles to and across the end of the second conveyer, the first conveyer delivering to the second and the second to the third and rollers interposed between the ends of the delivery conveyers and the edges of the conveyers to which they deliver.

4. In conveying apparatus, the combination of a conveyer, a second conveyer in line with the first but separated therefrom by an open space, a third conveyer disposed at right angles to the first two, occupying the open space between them and adapted to receive material delivered by one of them, the third conveyer being movable from between the first two conveyers, and a cross-over conveyer adapted to be interposed between the first two conveyers to connect them when the intermediate transverse conveyer is moved out of the way.

5. The combination stated in claim 4 when the cross-over conveyer is movable with the intermediate transverse conveyer, and means for moving the transverse conveyer whereby either it or the cross-over conveyer is interposed in working position between the first two conveyers at the will of the operator.

6. The combination stated in claim 4 including a fourth conveyer disposed at right angles to the intermediate transverse conveyer and lying across the end of the latter, to which it delivers.

7. The combination stated in claim 4 including means for positively driving the cross-over conveyer at will.

8. The combination stated in claim 4 when the cross-over conveyer consists of a series of rotatable rollers, and means for positively driving the rollers when the cross-over conveyer is brought into working position.

9. In conveying apparatus, the combination of a conveyer, a second conveyer in line with the first but separated therefrom by an open space, a transverse endless traveling conveyer mounted in a frame pivotally supported on an axis remote from the first and second conveyers, and adapted to receive material from the first conveyer, a cross-over conveyer mounted in the pivoted frame of the transverse conveyer but in a different plane from the working run of the latter, and means for moving the frame of the transverse conveyer about its pivot whereby either the working surface of the transverse conveyer is brought into position to receive material from the first conveyer or the cross-over conveyer is brought into line to bridge the space between the first and second conveyers accordingly as the frame is adjusted.

10. The combination stated in claim 4 when the first conveyer is provided with freely turning rollers on which the articles being delivered are supported, and stop means for arresting the forward movement of the articles while the position of the transverse conveyer is being changed.

GUSTAV R. RODDY.